March 31, 1964     W. ZLOCZOWER     3,127,545
RECTIFIER
Filed Dec. 23, 1960
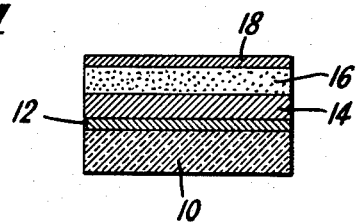
*Fig. 1*
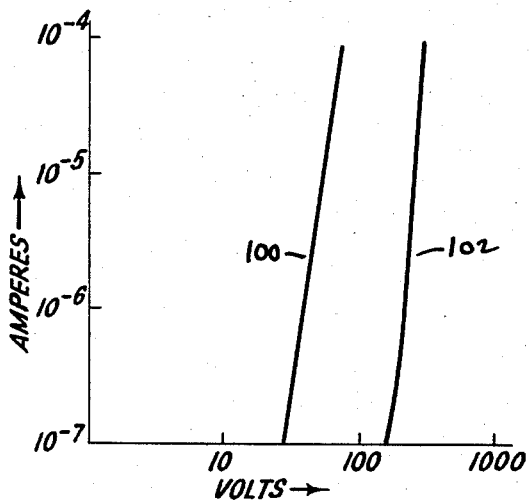
*Fig. 2a*
*Fig. 2b*
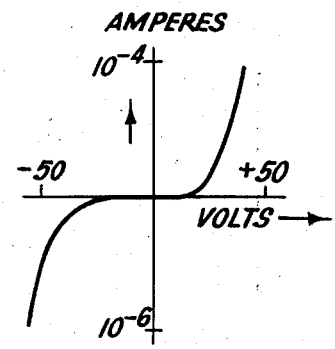
*Fig. 3b*
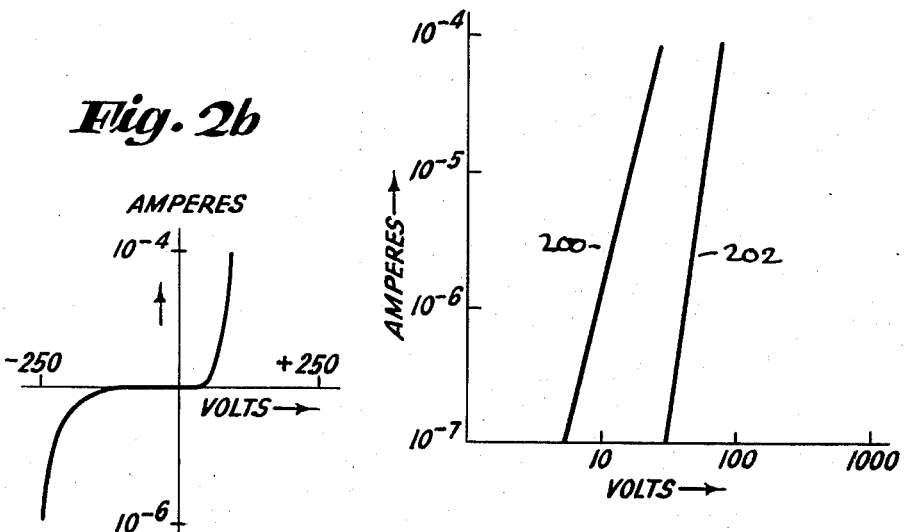
*Fig. 3a*
INVENTOR
WALTER ZLOCZOWER
BY Theodore Jay Jr.
ATTORNEY

United States Patent Office 3,127,545
Patented Mar. 31, 1964

3,127,545
RECTIFIER
Walter Zloczower, Forest Hills, N.Y., assignor to General Telephone and Electronics Laboratories, Inc., a corporation of Delaware
Filed Dec. 23, 1960, Ser. No. 78,001
7 Claims. (Cl. 317—241)

My invention is directed toward rectifiers and rectifier arrays.

Certain information processing systems which employ a plurality of sandwiched layers of electronically active materials such as electroluminescent phosphors and photoconductors, also utilize many individual rectifiers. Conventionally, these rectifiers are either of the electron discharge type (tubes) or the crystal type (semiconductors). The incorporation of these individual rectifiers into such systems is a tedious and costly procedure. I have invented a new type of rectifier which can be formed separately in situ. When desired, an array of these rectifiers can be formed simultaneously on a coplanar substrate. Consequently, my rectifier or rectifier arrays can be formed on a surface of one or more layers of electrically active materials to produce an integral sandwich-like structure.

Further, I have invented a new process for producing this type of rectifier which can be carried out with ease and at low cost. In addition, by suitably controlling the parameters of my process, certain electrical characteristics of the rectifier such as the reverse impedance, breakdown voltage and rectification ratio can be varied over a wide range.

In accordance with the principles of my invention, one or more electrodes are secured to a surface of a suitable substrate. (When more than one electrode is used, the electrodes can be insulatedly separated from each other.) A selenium layer is applied over the electroded surface. A layer of crystallized cadmium sulfide powder is then applied over the selenium layer. Electrodes are then applied over the powder in registration with the electrodes on the substrate. The resulting structure then comprises a single rectifier or a rectifier array, the number of rectifiers in the array being determined by the number of electrodes carried by the substrate.

Illustrative embodiments of my invention will now be described with reference to the accompanying drawings, wherein:

FIG. 1 is a cross sectional view of one rectifying element in accordance with the principles of my invention;

FIGS. 2a and 2b illustrate certain voltage-current characteristics of the element of FIG. 1 when the selenium layer of the element is chemically treated after formation thereof; and FIGS. 3a and 3b illustrate certain voltage-current characteristics of the element of FIG. 1 when the element is prepared without chemical treatment of the selenium element.

Referring now to FIG. 1, there is shown a rectifier comprising a glass substrate 10 supporting a first electrode 12. A selenium layer 14 is applied over electrode 12. A layer of crystallized cadmium sulfide powder 16 is applied over the selenium layer 14. A second electrode 18 is applied over the powder layer 16.

In forming the rectifier, the first electrode, for example, a gold electrode, can be fused to the top surface of the substrate. Molten selenium is then poured or spread over the electroded substrate and is allowed to cool and solidify. The cooled layer forms a vitreous amorphous allotrope of selenium. A layer of crystallized cadmium sulfide powder is then applied over the selenium layer, as, for example, spraying a mixture consisting of 3 parts by weight of powder in a vehicle of 2 parts by weight of xylene containing 2 percent by weight of dissolved ethyl cellulose (or other plastics) over the layer. After the xylene has evaporated, the structure so formed is then heated, for example, to a temperature of 185° C. to convert the amorphous selenium to the hexagonal allotrope of selenium. The rectifier is completed by applying the top electrode thereto. Typically, this electrode can be applied by spraying or vacuum evaporating a mixture of nickel powders on top of the sulfide layer. Alternatively, the top electrode can be applied prior to the heat treatment for converting the selenium layer from the amorphous allotrope to the hexagonal allotrope.

A rectifier having a ⅛″ square area with a selenium layer about 8 mils thick and a powder layer about 8 mils thick was tested. It was found that the rectifier conducted in the forward direction when electrode 12 was maintained positive with respect to electrode 18 and conducted in the reverse direction when the polarity was reversed, as shown in FIGS. 3a and 3b. The voltage-current characteristic of the rectifier when conducting in the forward direction was found to be highly superlinear as shown by curve 200 in FIG. 3a. Similarly, the characteristics of the rectifier when conducting in the reverse direction was also found to be highly superlinear as shown by curve 202 in FIG. 3a.

Certain electrical characteristics of the rectifier can be significantly enhanced by dipping the selenium bearing substrate in a strongly alkaline solution containing dissolved selenium prior to applying the cadmium sulfide powder layer. (For example, a useful solution of this type can be prepared by placing 2 grams of selenium and 28 grams of potassium hydroxide in an inert container. A small amount of water is added and the selenium is dissolved. The solution is then diluted to 100 milliliters and, as a consequence, is 5 molar with respect to the hydroxide and is supersaturated with selenium.) The selenium bearing substrate can then be immersed in this solution for several minutes, the treatment completion being indicated by the formation of a uniform dull film on the selenium surface.

Typical electrical characteristics of rectifiers so treated are shown in FIGS. 2a and 2b. Curve 100 in FIG. 2a shows the forward voltage-current characteristics while curve 102 shows the reverse voltage-current characteristics.

The breakdown voltage can vary from about 100 volts for the untreated rectifier to about 500 volts for the treated rectifier. As can be seen from the graphs, the reverse impedance is of the order of 50 megohms at 50 volts for the untreated rectifier and is of the order of 250 megohms at 250 volts for the treated rectifier.

The rectification ratio (which is the ratio of the forward current to the reverse current at a given voltage) can be varied from about 10 to about 10,000 depending upon variations in preparation.

The rectifier arrays can be formed in a manner of different ways. For example, electrodes of larger area can be formed and then subdivided into a plurality of small separated electrode elements at the appropriate stages of processing, the selenium and sulfide layers remaining continuous. Alternatively, graphic arts techniques can be used to form these separated elements in situ.

The arrays discussed in the preceding paragraph use continuous layers and separated electrode elements. When desired, thesee arrays can be formed with discontinuous selenium and sulfide layers. For example, grooves can be cut into a glass substrate and a separate rectifier can be formed in each groove using the processes previously described. The individual grooves will confine the molten selenium and the sulfide powder to the regions desired.

The crystallized cadmium sulfide powder can be, for example, of the types disclosed in the copending applications of Moe Wasserman, Serial No. 22,450, filed April 15, 1960, and of G. Morrison et al., Serial No. 792,977, filed February 13, 1959.

What is claimed is:

1. A rectifier comprising first and second spaced apart electrodes; a selenium layer interposed between said electrodes; a layer of polycrystalline cadmium sulfide powder interposed between the selenium layer and one of said electrodes; and an electrically non-conductive substrate supporting said electrodes and layers.

2. A rectifier comprising a substrate; an electrically non-conductive first electrode on said substrate; a selenium layer applied over said first electrode; a layer of polycrystalline cadmium sulfide powder applied over said selenium layer; and a second electrode applied over said powder layer.

3. A rectifier comprising first and second spaced apart electrodes; a selenium layer interposed between said electrodes, said selenium having the form of a hexagonal allotrope; a layer of polycrystalline cadmium sulfide powder interposed between the selenium layer and one of said electrodes; and an electrically non-conductive substrate supporting said electrodes and layers.

4. A method for producing a rectifier which comprises the steps of coating a first electrode with molten selenium; permitting said selenium to solidify; spraying a mixture consisting of cadmium sulfide powder in a vehicle of xylene containing a plastic constituent on top of the layer formed by said solidified selenium, said mixture forming a polycrystalline cadmium sulfide powder layer; and applying a second electrode on top of said powder coating.

5. A method for producing a rectifier which comprises the steps of applying a conductive film to a surface of an electrically non-conductive substrate; coating said film with a selenium layer; spraying a mixture consisting of cadmium sulfide powder in a vehicle of xylene containing dissolved ethyl cellulose on top of the layer formed by said selenium, said mixture forming a polycrystalline cadmium sulfide powder layer; and applying an electrode over said powder coating.

6. A method for producing a rectifier which comprises the steps of applying a conductive film to a surface of an electrically non-conductive substrate; coating said film with a selenium layer; dipping said selenium coated substrate in a strongly alkaline solution containing dissolved selenium; spraying a mixture consisting of cadmium sulfide powder in a vehicle of xylene containing a plastic constituent on top of the layer formed by said selenium, said mixture forming a polycrystalline cadmium sulfide powder layer; and applying an electrode over said powder coating.

7. A method for producing a rectifier which comprises the steps of coating a first electrode with molten selenium; permitting said seleminum to solidify and form an amorphous selenium allotrope; spraying a mixture consisting of cadmium sulfide powder in a vehicle of xylene containing dissolved ethyl cellulose on top of the layer formed by said solidified selenium, said mixture forming a polycrystalline cadmium sulfide powder layer; and applying a second electrode on top of said powder coating.

References Cited in the file of this patent

UNITED STATES PATENTS

| | | |
|---|---|---|
| 2,227,827 | Dubar | Jan. 7, 1941 |
| 2,426,173 | Bloom | Aug. 26, 1947 |
| 2,444,255 | Hewlett | June 29, 1948 |
| 2,444,473 | Skinner et al. | July 6, 1948 |
| 2,479,446 | Wilson | Aug. 16, 1949 |
| 2,496,692 | Blackburn | Feb. 7, 1950 |
| 2,498,240 | Blackburn | Feb. 21, 1950 |